INVENTORS
CHARLES L. JACOBSON
DONALD E. MACK
BY Anthony D. Cennamo
ATTORNEYS

INVENTORS
CHARLES L. JACOBSON
DONALD E. MACK
BY
ATTORNEYS 3,510,803

FREQUENCY MODULATOR CIRCUIT FOR GENERATING A PLURALITY OF FREQUENCIES BY THE USE OF A UNIJUNCTION TRANSISTOR

Charles L. Jacobson and Donald E. Mack, Rochester, N.Y., assignors to Xerox Corporation, Rochester, N.Y., a corporation of New York Filed Dec. 30, 1966, Ser. No. 606,276
Int. Cl. H03k 17/62, 7/00; H04l 27/12
U.S. Cl. 332—14 5 Claims

ABSTRACT OF THE DISCLOSURE

A modulator for use in generating frequency shift-keyed signals. A plurality of frequencies is generated in response to an information signal applied thereto by selectively applying different input resistances to a transistor pulse generator.

BACKGROUND

In the frequency modulating technique known as frequency shift-keying, data transmission is accomplished by assigning a different carrier frequency to each state of the data, i.e., mark and space, and transmitting the appropriate frequency for a period of time sufficient to assure reliable detection. The technique may be extended to include frequency transmission of data information with more than the normal two-level mark and space frequencies. That is, in a multi-level data transmission system employing frequency shift keying, a plurality of frequencies would be transmitted, one frequency for each level in the data waveform.

Transmission of the frequency modulated or frequency shift-keyed signal may be accomplished over any of the known transmission media, such as telephone lines, microwave installations, and direct wire. At a receiving location, the frequency modulated signals would be demodulated and detected in order to recover the original transmitted information.

A prior art technique of modulating a binary or multi-level signal into frequency modulated or frequency shift-keyed signals is to energize a plurality of oscillators at the proper time and transmit such frequencies to a receiving location. Such a system, however, is undersirable, as a plurality of free-running oscillators is necessary together with synchronization and phasing requirements to allow for efficient transmission of the information. Such free-running oscillators also have the inherent defect of generating high frequency transients upon being keyed by the command signals. Such high frequency transients are inherently undesirable as it results in increased jitter and subsequent information distortion.

OBJECTS

It is, accordingly, an object of the present invention to provide an improved frequency modulated signal modulator.

It is another object of the present invention to improve the performance of a data transmission system utilizing frequency shift-keying.

It is another object of the present invention to improve the modulation of frequency shift-keyed signals.

It is another object of the present invention to effectively generate a plurality of frequency shift-keyed signals in response to an information waveform.

BRIEF SUMMARY OF THE INVENTION

In accomplishing the above and other desired aspects, applicant has invented novel apparatus for accurately generating specific frequency signals in accordance with a multi-level data information waveform. Such a multi-level data waveform may include an actual multi-amplitude signal, or a plurality of two level signals representing such multilevel information as utilized in the disclosed embodiment. The invention utilizes a unijunction transistor as the signal generator. Across the input to the unijunction transistor are a plurality of switching transistors and associated resistances to alter the R-C time constant across the input to the transistor. As the plurality of transistors are selectively energized, the input resistance seen by the unijunction transistor varies in accordance with the predetermined input information allowing the unijunction transistor to generate the plurality of frequencies in accordance with such information. These generated frequencies are then utilized to operate a bistable multivibrator to render the output signals symmetrical, and leaving only the odd harmonic frequencies in the output spectrum.

DESCRIPTION OF THE DRAWING

For a more complete understanding of the invention, as other objects and further features thereof, reference may be had to the following detailed description in conjunction with the drawings wherein.

DETAILED DESCRIPTION OF THE INVENTION

Figure 1:
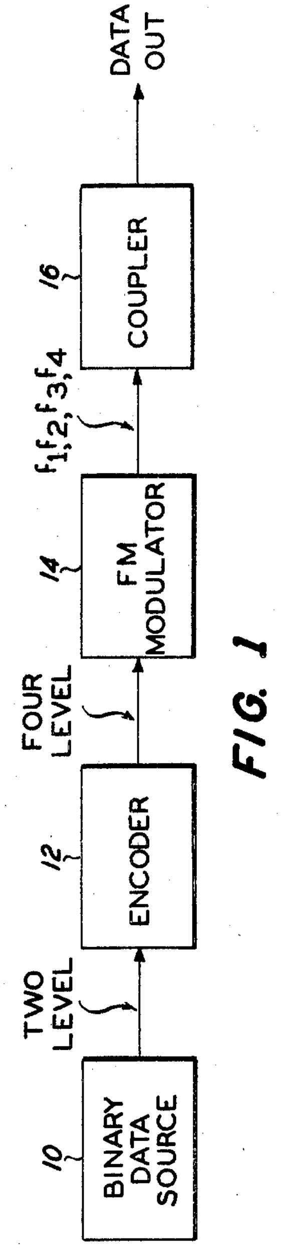
FIG. 1 is a block diagram of the modulator in an information transmitter in accordance with the principles of the present invention.

Referring now to FIG. 1, there is shown a block diagram of the transmitter system for a multi-level signal to be transmitted over a transmission media of any known type. The binary data source 10 may be any primary source of information which produces a series of binary pulses originally in or converted from analog to digital form. Such a source could be, for example, the output from an electronic computer, or a facsimile scanning system. The information may be compressed or uncompressed depending upon the economic efficiencies and capabilities of the system, as by any of the bandwidth compression techniques known in the art. The two-level signal from the binary data source 10 would then pass to the encoder 12 which, by any known manner, would convert the two-level input signal to a multi-level output signal. For purposes of example and ease of illustration, the description is drawn to a four level output signal from encoder 12. In operation, the encoder 12 may look at successive series of two binary digits and generate a voltage level for each of the four possible combinations of two binary digits, commonly called di-bits. For this example, therefore, encoder 12, in any known manner, will generate a four-level voltage signal or binary data signals representative of the multi-level information in response to binary digits of the sequence 00, 01, 10 and 11.

The output of encoder 12 is then used to trigger the FM modulator 14 to generate the four frequencies in a manner more fully hereinafter described. As indicated in FIG. 1, the frequencies are set forth as $f_1$, $f_2$, $f_3$ and $f_4$. If transmission is to take place over an ordinary telephone communication line, the frequencies set forth would necessarily be in the audio range, however, any such frequencies could be utilized without deviating from the principles of the present invention.

At the output end of the transmitter system, utilizing the modulator in accordance with the present invention, would be any type of coupling apparatus 16 to couple the modulated signals to the transmission line. Such a coupler could be a direct electronic coupler, or may be of the acoustic coupling type whereby the information to be transmitted is acoustically transferred, as via a telephone hand-set on the end of a telephone network, for example.

Figure 3:
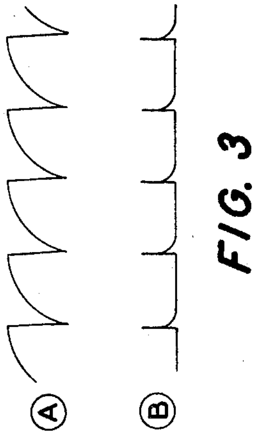
FIG. 3 shows various waveforms helpful in understanding the schematic diagram of FIG. 2.
Figure 2:
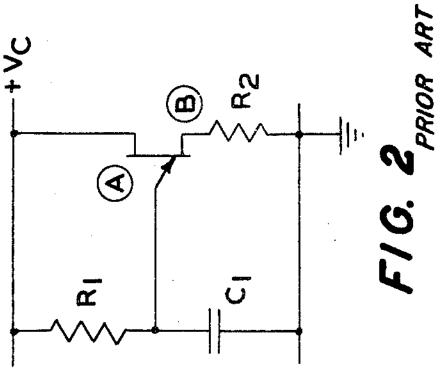
FIG. 2 PRIOR ART
FIG. 2 shows the basic circuitry utilized in the modulator circuit.

FIG. 2 shows a conventional prior art circuit utilizing a unijunction transistor as a relaxation oscillator for pulse generation. Such a circuit is found at page 315 of the 7th edition of the General Electric Transistor Manual. When voltage $V_c$ is applied to the circuit in FIG. 2, point A charges toward $V_c$ at a rate determined by the $R_1C_1$ time constant. When it reaches a certain percentage of $V_c$, this percentage being determined by $\eta$ the intrinsic standoff ratio of the unijunction transistor, the transistor conducts and capacitor $C_1$ discharges toward ground potential through resistor $R_2$. As this discharge takes place, as shown in FIG. 3A, a voltage spike will appear at point B in FIG. 2 and seen at FIG. 3B, due to the current flowing through resistor $R_2$. After point A has discharged nearly to ground potential, the unijunction transistor stops conducting and point A again starts charging toward $V_c$. If resistor $R_1$ is much greater than resistor $R_2$, such that the discharge time of capacitor $C_1$ is much shorter than the charging time thereof, the frequency controlling elements are $R_1$, $C_1$ and $\eta$. An approximate formula for determining the frequency generated is seen to be $$f \simeq \frac{1}{R_1C_1 \ln\left(\frac{1}{1-\eta}\right)}$$

If the frequency of the relaxation oscillator were to be varied, one of the controlling element values in the above equation would have to be changed. As $\eta$ is an inherent characteristic of the unijunction transistor, either resistor $R_1$ or capacitor $C_1$ must be varied.

In prior art frequency shift modulators, a major problem of signal distortion is the time jitter of the generated frequencies due to the phase error occurring at the time of switching. In the Bell System Technical Journal, vol. 51, November 1962 in an article entitled, "An Analysis of Inherent Distortion in Asynchronous Frequency-Shift Modulators" at page 1695 is stated that modulators using multivibrators may be designed to cause as small a jitter as desired. At page 1724 of the same article it is pointed out that the multivibrator type of modulator may be designed to have as little jitter as desired by making the control voltage very much greater than the supply voltage thereto. Unfortunately, however, to reduce jitter to a point where it is non-existent such a control voltage would have to be an unrealistically high value. The subject invention, on the other hand, completely eliminates time jitter of the generated frequency signals by switching the pulse transistor generator at the proper time to allow for phase continuity.

It can be shown that $$T_e = \tau_2\left[-\frac{t_o}{\tau_1} - \mathrm{Ln}(1-a)\right] - \gamma_2 + \frac{\gamma_2}{\gamma_1}t_o$$

where $T_e$=the time difference between the zero crossing of an ideal FM wave and the initiation of the square wave pulse in the unijunction transistor pulse generator.

$\tau_1$, $\tau_2$=different applied R-C time constants.

$t_o$=time from last transition until change to new time constant.

$a=\eta\, V_s/V_k$.

$\eta$=transistor intrinsic standoff ratio.

$V_s$=supply voltage.

$V_k$=control voltage.

$\gamma_1$=width of pulses corresponding to first time constant.

$\gamma_2$=width of pulses corresponding to new time constant.

and rearranging $$T_e = t_o\left[\frac{\gamma_2}{\gamma_1} - \frac{\tau_2}{\tau_1}\right] - \tau_2\mathrm{Ln}(1-a) - \gamma_2$$

since $$\gamma_2 = \tau_2\mathrm{Ln}\left(\frac{1}{1-a}\right)$$

and $$\gamma_1 = \tau_1\mathrm{Ln}\left(\frac{1}{1-a}\right)$$

then $$\frac{\gamma_2}{\gamma_1} = \frac{\tau_2}{\tau_1}$$

thus $$T_e = -\tau_2\mathrm{Ln}(1-a) - \gamma_2$$
$$= -\tau_2\mathrm{Ln}(1-a) + \tau_2\mathrm{Ln}(1-a)$$

since $$-\gamma_2 = \tau_2\mathrm{Ln}(1-a)$$

then $$T_e = 0$$

and is independent of $t_o$, the switching time of the transistor. Therefore, by changing the time constant applied to the unijunction transistor, any jitter due to phase discontinuity is non-existent and is independent of switching time, and switching constants. Furthermore, this is true regardless of the direction of frequency change—that is, either from a high or low frequency to a low or high frequency. In addition, the disclosed modulator, in accordance with the principles of the present invention, does not require a linear charging voltage to the base of the unijunction transistor as in an astable multivibrator functioning as a voltage controlled oscillator to minimize jitter, as hereinbefore set forth as a conventional technique of designing an FM modulator.

Figure 4:
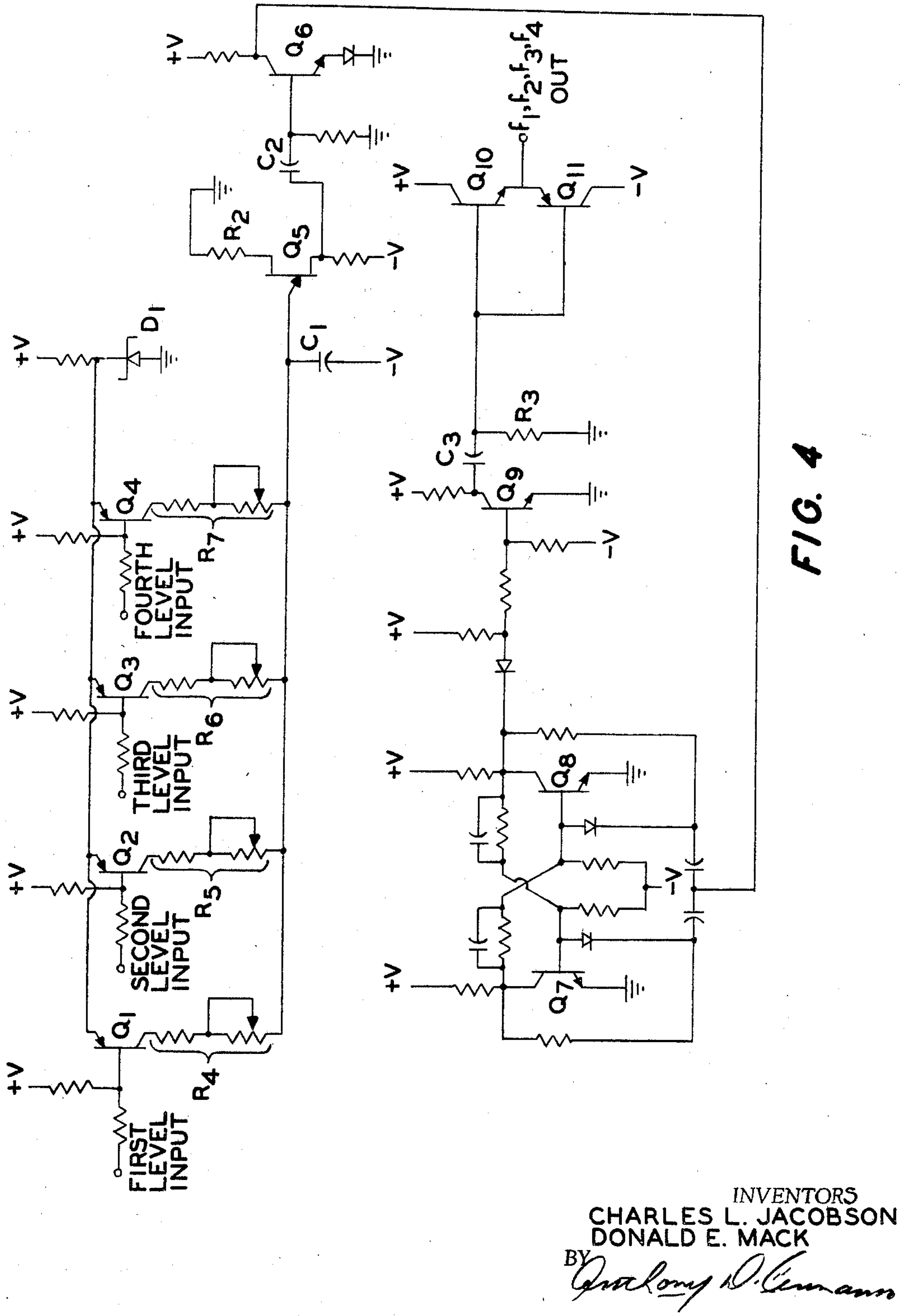
FIG. 4 is a schematic diagram of the frequency modulator in accordance with the principles of the present invention.

The FM modulator as shown in FIG. 4 changes the frequency generated by changing the input resistance as seen by the unijunction transistor $Q_5$ and leaving the valve of capacitor $C_1$ constant. By utilizing transistors $Q_1$, $Q_2$, $Q_3$ and $Q_4$ for, in this case, binary signals representative of the multilevel information, or additional transistors for a higher level input signal, and resistors $R_4$, $R_5$, $R_6$ and $R_7$, different values of resistance are presented to the unijunction transistor $Q_5$, thereby allowing the plurality of frequencies to be generated. Only one of the four transistors would be turned on at one time, thus charging capacitor $C_1$ through an associated resistor in series with the transistor to give a single, discrete frequency output. For example, if at a particular instance transistor $Q_1$ was applied with a signal representative of the first data level, the voltage at the base of the transistor $Q_1$ would be biased below the voltage applied to the emitter thereof, thereby switching the transistor to the "on" state. Current would then flow through resistor $R_4$, determining a predetermined $R_4$-$C_1$ time constant to generate the particular frequency for the component values chosen.

In order to provide a constant voltage to the several transistors, regardless of the load upon the transistors, Zener diode $D_1$ is provided across the emitters of the transistors. The pulses at the output of the unijunction transistor which occur at the discharge frequency thereof, are A-C coupled through capacitor $C_2$ into a switch, transistor $Q_6$, to make the pulses large enough to trigger the flip-flop circuit consisting of transistors $Q_7$ and $Q_8$. This flip-flop makes the output signals symmetrical, thereby leaving only the odd harmonics in the output frequency spectrum. The output from the flip-flop now at one half its input signal rate is passed to a gate comprising transistor $Q_9$. The D-C component of the signal is effectively removed by resistor $R_3$ and capacitor $C_3$, centering the signal about ground or zero potential. The time constant of $R_3$ and $C_3$ should be long in relation to the inverse of the generated frequency. The signal is then passed to transistors $Q_{10}$ and $Q_{11}$ for power amplification before transmittal to the coupler 16 seen FIG. 1.

These frequencies would then be transmitted, by any of the known transmission techniques, to a receiver for subsequent demodulation and detection of the transmitted information. A typical receiving location would comprise a coupler to receive the signals from the transmission lines and to put the signals into condition for demodulation by the receiver circuits. A limiter circuit could be utilized to amplify and limit the transmitted signals into a waveform of essentially a squarewave pattern. Any of the known zero crossing detectors could be utilized to generate signals every time the frequency modulated signals cross the axis which represents the long-term average value of the signal. These generated pulses can then be used to trigger a one-shot multivibrator to generate signals of constant or varying time width for application to a lowpass filter network, which effectively takes the short-term average value of the signal. The short-term average value signal is the information, now appearing as a multilevel signal. This multilevel signal can then be applied to a decoder of any known design to recover the original data information as applied from a facsimile scanner or computer, as hereinbefore set forth.

In the foregoing, there has been disclosed apparatus for efficiently generating frequency shift-keyed signals in response to a multilevel data waveform. The invention may be extended, however, to include generating frequency modulated signals from an analog signal by using any of the known variable components to change the time constant. The circuitry was described in conjunction with a four-level input signal; but it is apparent that four data levels are exemplary only, as any number of levels could be utilized for generating specific frequencies in a similar manner in accordance with the principles of the present invention. Thus, while the present invention, as to its objects and advantages, as described herein, has been set forth in specific embodiments thereof, they are to be understood as illustrative only and not limiting.

What is claimed is:

1. A system for generating frequency modulated signals with a total absence of jitter comprising:
- a source of data signals of at least two data levels, said data signal source comprising:
  - a binary data source, and
  - encoder means coupled to said binary data source for converting said binary data into a plurality of two level signals representative of said data signals,
- modulator means coupled to said signal source for generating a predetermined frequency signal for each data level in the date waveform, said modulator means comprising:
  - a plurality of gating means for selectively gating a voltage potential in response to each of said input data signal levels,
  - a plurality of resistor means coupled to said plurality of gating means for respectively transferring the gated voltage potential,
  - capacitor means coupled to said resistor means for storing said gated voltage potential at the rate determined by the R-C time constant of said capacitor means and the gated resistor means,
  - a unijunction transistor pulse frequency signal generator coupled to said plurality of resistor means and said capacitor means, said capacitor means enabling said unijunction transistor means at the rate determined by the respective R-C time constants upon reaching a predetermined stored voltage potential, and
- multivibrator means for generating pulses of essentially square wave format in response to said pulse frequency signals.

2. A circuit for generating frequency modulated signals with a total absence of jitter in accordance with a multilevel data signal source,
- a plurality of input terminals each to respectively receive one data state of said multilevel signal,
- a plurality of gating means coupled to said plurality of input terminals for selectively gating a voltage potential in response to each of said input data signal levels thereto,
- a plurality of resistor means coupled to the output of said plurality of gating means to control the current gated therethrough according to a predetermined pattern,
- capacitor means coupled to said plurality of resistance means for storing said current at the rate determined by the particular R-C time constant of the capacitor means and the gated resistor means,
- transistor means coupled to said plurality of resistor means and said capacitor means for generating short duration signal pulses by discharging said capacitor means upon reaching a predetermined stored voltage potential at a frequency determined by the respective R-C time constants.

3. The circuit as defined in claim 2 wherein said transistor means comprises a unijunction transistor.

4. The circuit as defined in claim 3 wherein said gating means comprises a plurality of bi-polar transistors.

5. The circuit as defined in claim 4 further including
- switch means coupled to said unijunction transistor for generating pulses of uniform amplitude in response to the discharged voltage pulses from said capacitor means,
- multivibrator means coupled to said switch means for generating pulses of essentially square wave format.

References Cited

UNITED STATES PATENTS

| | | | |
|---|---|---|---|
| 2,816,238 | 12/1957 | Elliott | 307—250 X |
| 2,859,408 | 11/1958 | Holzer | 332—11 |
| 3,137,797 | 6/1964 | Reach et al. | 307—250 X |
| 3,214,708 | 10/1965 | Chamberlain | 332—14 |
| 3,247,323 | 4/1966 | Carroll | 307—250 X |
| 3,378,698 | 4/1968 | Kadah | 307—246 X |

ALFRED L. BRODY, Primary Examiner

U.S. Cl. X.R.

178—66; 307—246, 247, 250; 325—30, 38, 163; 328—66; 332—11